July 26, 1966

YOSHINORI FUJISAKI 3,262,157

METHOD AND APPARATUS FOR MANUFACTURING COILED FASTENER ELEMENTS

Filed Sept. 17, 1964

United States Patent Office 3,262,157
Patented July 26, 1966

3,262,157
METHOD AND APPARATUS FOR MANUFACTURING COILED FASTENER ELEMENTS
Yoshinori Fujisaki, Kurobe-shi, Japan, assignor to Yoshida Kogyo K.K., Chuo-ku, Tokyo, Japan, a corporation of Japan
Filed Sept. 17, 1964, Ser. No. 397,178
Claims priority, application Japan, Nov. 13, 1963, 38/61,070; Nov. 20, 1963, 38/62,402
8 Claims. (Cl. 18—19)

The present invention relates to an improved method and apparatus for manufacturing continuously coiled fastener elements of thermoplastic material.

A method and apparatus for the manufacture of continuously coiled fastener elements have already been proposed and known in the art, in which a wire of thermoplastic material such as synthetic resin or the like is spirally coiled about a rod and the spirally formed wire is guided between the opposed threads of a pair of parallelly disposed screws for obtaining the coiled fastener elements.

The primary object of the present invention is to provide an improved method and apparatus of the type described above, in which improvements are effected in the structure of the rod about which a wire of thermoplastic material is spirally coiled, in the structure of a rod holder adjacent a point at which the holder supports the rod for the operation thereof, and in the structure of the rotary screws disposed on opposite sides of the rod in parallelly juxtaposed relation therewith, whereby to obtain an exquisite operation of guiding the wire towards the root portion of the rod as well as a novel operation of rectifying the shape of loops of coil by the rotary screws. According to the invention, an apparatus of remarkably simple structure can continuously and automatically manufacture coiled fastener elements with each loop having opposite leg portions in parallel with each other, the manufacture of which has heretofore required an extremely complicated apparatus.

According to the invention, there is provided an apparatus for manufacturing coiled continuous fastener elements from a wire of thermoplastic material comprising rod means for coiling a wire of thermoplastic material thereabout, a pair of rotatable screw means having a substantially same pitch and disposed on opposite sides of said rod means in closely juxtaposed parallel relation therewith, said screw means being operative to feed the wire coiled about said rod means while rectifying the shape of the coiled wire, said rod means being so shaped that the diameter of a portion thereof about which the wire is first coiled is made greater than the diameter of the remaining portion thereof, and a rod means holder for supporting the lower end of said rod means at a position adjacent the portion of said rod means about which the wire is first coiled, said rod means holder being vertically slidable for thereby causing a reciprocating movement of said rod means in the axial direction thereof.

According to the invention, there is also provided an apparatus of above character, in which said rod means consists of a first rod of constant diameter throughout its length and a second rod disposed in side-by-side relation to said first rod so that said rod means has a greater diameter than the remaining portion at a position at which said second rod is juxtaposed with said first rod.

According to the invention, there is also provided an apparatus of above character, in which means are provided to enable the adjustment of relative positions of said pair of screw means in the axial direction thereof.

According to the invention, there is provided an apparatus of above character, in which the lower end of one of said pair of screw means terminates at a position lower than that of the other screw means.

According to the invention, there is further provided an apparatus of above character, in which shoulders are formed at the upper end of said rod means holder in a manner that the shoulder disposed below said screw means having the lower end terminating at the lower position is made lower than the shoulder on the opposite side so as to avoid any interference on the coiling operation of the wire by the shoulders of said rod means holder and in which the axially reciprocating movement of said rod means is effected in synchronism with the coiling of the wire and rotation of said screw means.

According to the invention, there is also provided an apparatus of above character, in which said pair of screw means have the screw threads of the same direction so that said screw means can rotate in the same direction.

According to the invention, there is further provided an apparatus of above character, in which relative positions of adjacent screw threaded portions of said parallelly disposed screw means are such that the position of the screw threaded portion of one of said screw means with the lower end terminating at the lower position is made slightly higher than that of the other screw means whereby one row of aligned leg portions of the coiled continuous fastener element rectified in its shape by said screw means can be made substantially parallel with the other row of aligned leg portions of the coiled element.

According to the invention, there is also provided an apparatus for manufacturing coiled continuous fastener elements comprising a stationary sleeve, a bobbin mounted on said stationary sleeve for rotation thereabout for thereby supplying a wire of thermoplastic material, a rod means holder operatively connected with a shaft slidably fitted in said stationary sleeve for free vertical movement therein, shoulders formed at the top end of said rod means holder, a rod means consisting of a first rod and a second rod of shorter length than the first rod and firmly fixed to said rod means holder centrally thereof, a pair of rotary screw means parallelly disposed on opposite sides of said rod means and having their lower ends terminating in staggered relation from each other, screw means holders for supporting said first rod and said screw means extending upwardly therethrough, and control blocks for rotatably receiving therein upper portions of said screw means for effecting vertical movement of said screw means independently of each other.

According to the invention, there is further provided a method for manufacturing continuously coiled fastener elements of thermoplastic material comprising the steps of coiling a wire of thermoplastic material such as synthetic resin about an enlarged diameter portion of a rod means, feeding the coiled wire towards a reduced diameter portion of the rod means by one of a pair of rotatable screw means having a substantially same pitch and disposed on opposite sides of the rod means in parallelly juxtaposed relation therewith, and further feeding the coiled wire wound about the reduced diameter portion upwardly along the rod means by both of the screw means, meanwhile suitably selecting the axial position of one of the screw means relative to the axial position of the other to obtain a desired positional relation between opposed leg portions of the coiled fastener element.

According to the invention, there is also provided a method for automatically manufacturing continuously coiled fastener elements of thermoplastic material comprising the steps of coiling a wire of thermoplastic material such as synthetic resin about a rod means consisting of a first rod and a second rod of shorter length than the first rod, and feeding the coiled wire by a vertical movement of a rod means holder having shoulders of different heights formed at its top end and by a pair of screw means disposed on opposite sides of the rod means in parallelly juxtaposed relation therewith and having their lower ends terminating at different levels, said screw means being rotatable in the same direction, the feeding operation being such that one of opposed leg portions in each loop of the coiled wire is always made to advance in suitably delayed relation with respect to the other leg portion so as to obtain a coiled fastener element with each loop having substantially parallel leg portions.

There are other objects and particularities of the invention which will become obvious from the following description with reference to the accompanying drawings, in which.

Figure 1A:
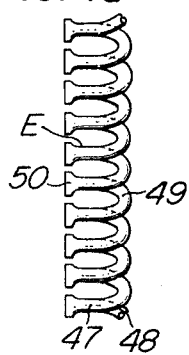
FIGS. 1a and 1b are a fragmentary side elevational view and a bottom plan view, respectively, of one form of a coiled fastener element manufactured by an apparatus embodying the invention.

The invention will now be described with reference to the drawings. At first referring to FIGS. 1 and 2, reference numeral 1 designates a rolling disk rotatably fitted about the outer peripheral face of a stationary guide sleeve 3 through bearings interposed therebetween. A shaft 7 is slidably disposed in the axial hollow space in the guide sleeve 3 so as to make an axially sliding movement with relation to the guide sleeve 3. A blank or wire W of thermoplastic material such as synthetic resin or the like is wound about a bobbin 4, which is rotatably supported by means of a supporting member 5 securely fixed to the upper face of the rolling disk 1. A spur gear 2 is coaxially firmly fixed to the bottom face of the rolling disk 1 to transmit the driving force from a motor (not shown) to the rolling disk 1 by way of a suitable reduction gearing so that the bobbin 4 can move along a circular path about the axis of the guide sleeve 3 when the rolling disk 1 is rotated.

Figure 2:
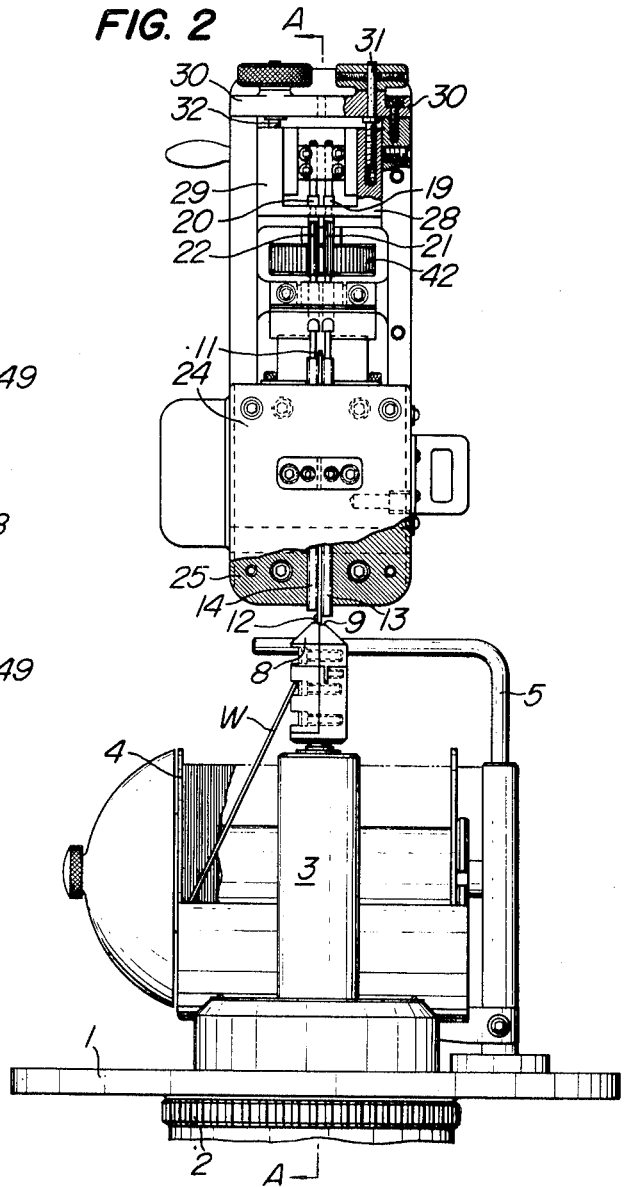
FIG. 2 is a front elevational view, partly in section, of a preferred embodiment of an apparatus according to the invention.
Figure 3:
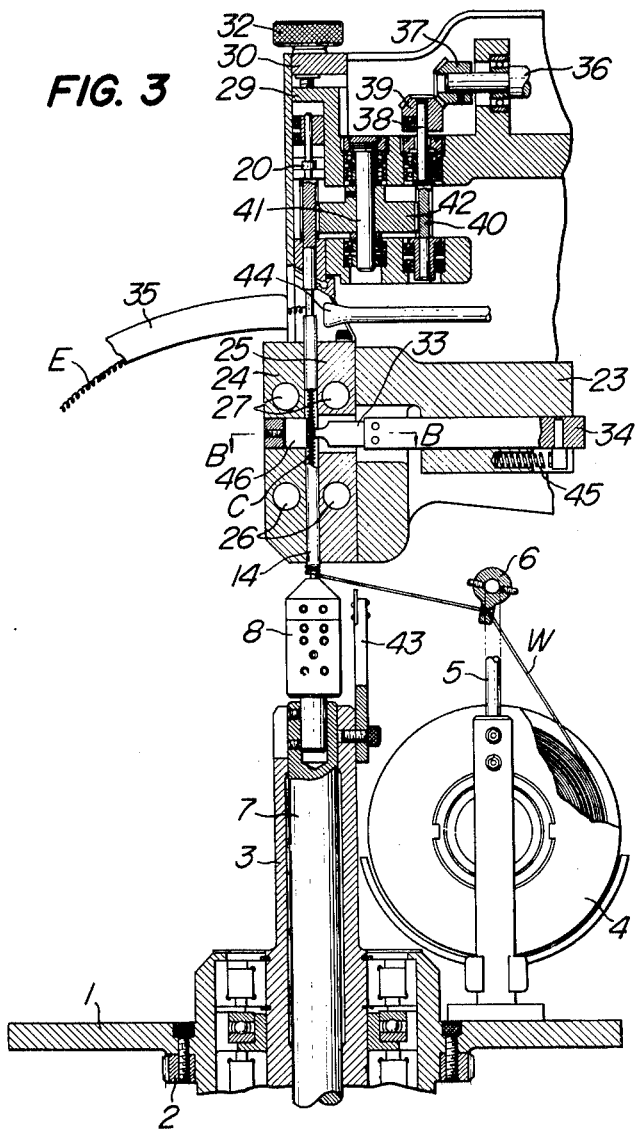
FIG. 3 is a longitudinal axial sectional view of the apparatus taken along the line A—A in FIG. 2 to show the internal structure thereof.
Figure 4:
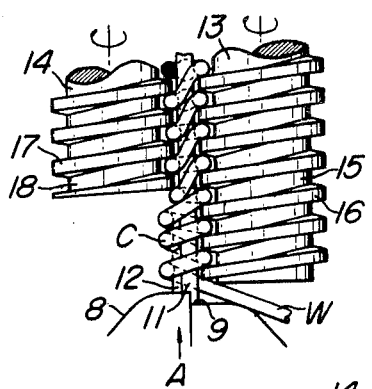
FIGS. 4–6 are enlarged front elevational views of parts of the inventive apparatus showing various stages of a loop forming operation to obtain a coiled fastener element.
Figure 5:
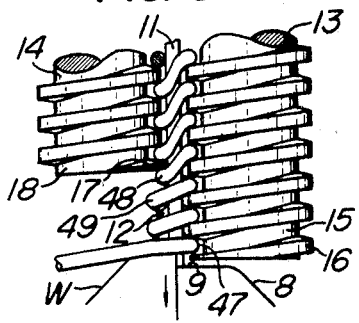
Figure 6:
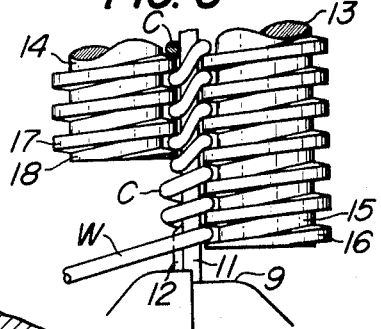
Figure 7:
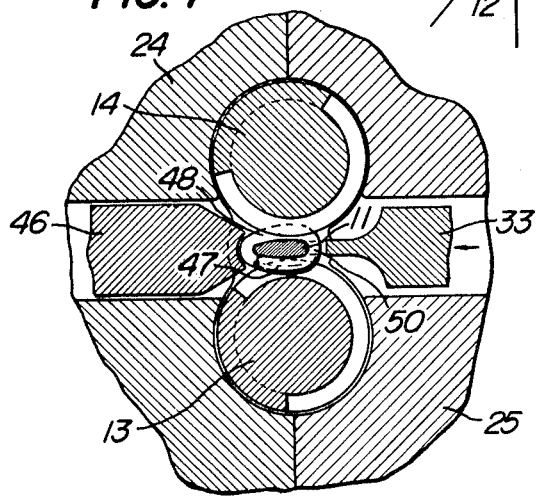
FIG. 7 is an enlarged sectional view of the apparatus taken along the line B—B in FIG. 3 to show an operation for forming interengaging heads on the coiled fastener element.

A rod holder 8 is coaxially mounted on the top portion of the slidable shaft 7 and firmly secured thereto. A rod 11 is firmly fitted to the head of the rod holder 8 and has a cross-sectional shape such as is shown in FIG. 7. An auxiliary rod 12 is also fitted to the head of the holder 8 in juxtaposed relation with the rod 11, but has a length far shorter than the rod 11 as shown in FIG. 2. The head of the rod holder 8 takes a generally frustoconical shape and is suitably stepped as at 9 to form shoulders thereon which are high on the side of the auxiliary rod 12 and low on the side of the rod 11 as shown in FIGS. 4 to 6. A cam means (not shown) is provided at a lower part of the apparatus to cause a vertical movement of the slidable shaft 7. Therefore, the rod 11 can be regularly moved upwardly and downwardly by the upward and downward movement of the slidable shaft 7 in synchronism with rotation of a pair of opposed screws 13 and 14 as will be described later and the circular movement of the bobbin 4 as described above.

As best shown in FIGS. 4–6, the screws 13 and 14 are rotatably disposed on opposite sides of the rod 11 in parallel therewith and have their lower ends terminating in opposed relation to and with different vertical distances from the stepped head portion 9 of the rod holder 8, that is, one of the screws 13 is made longer than the other screw 14. The screws 13 and 14 are so disposed that crest 16 and root 15 of the thread of the former and crest 17 and root 18 of the thread of the latter always face each other, and extend upwardly between screw holders 24 and 25 fitted to a frame member 23, with the rod 11 also extending upwardly through the screw holders 24 and 25 while being disposed between the opposed screws 13 and 14. Upper portions of the screws 13 and 14 are non-threaded, and adjacent their upper ends, there are provided stepped portions 19 and 20 on the respective screws 13 and 14. The stepped portions 19 and 20 are received in separate control blocks 28 and 29, respectively. Control screws 31 and 32 extend downwardly through a head cover 30 mounted on the top of the frame member 23 and are in screw threaded engagement with the respective control blocks 28 and 29 so that slight rotation of the control screws 31 and 32 in either direction will cause a correspondingly slight vertical movement of the rotary screws 13 and 14 independently of each other. Pinions 21 and 22 are formed on the non-threaded portions of the screws 13 and 14 below the stepped portions 19 and 20, respectively, and are in meshing engagement with a spur gear 42 rotatably mounted on a shaft 41. Rotational force for the spur gear 42 is transmitted by way of a counter shaft 36, a bevel gear 37 mounted thereon, and a bevel gear 39 and a spur gear 40 mounted on a shaft 38, the spur gear 40 being in meshing engagement with the spur gear 42. Therefore, it will be understood that the rotation of the spur gear 42 causes simultaneous rotation of the left-hand side and right-hand side rotary screws 14 and 13 in the same direction as shown in FIG. 4.

A punch 33 for forming an interengaging head 50 of a coiled fastener element E is horizontally carried by a punch holder 34, which is slidably disposed in the frame member 23 for horizontal reciprocating movement towards and away from a coil C of the wire W of thermoplastic material successively fed upwardly through the apparatus. A compression spring 45 is disposed adjacent the end of the punch holder 34 remote from the punch 33 to cause the retracting movement of the punch holder 34. A receiving member 46 is disposed opposite the punch 33 to support the coil C so that, when the wire W formed as the coil C and softened by means of heaters 26 and 27 is fed past an intermediate space or a point of head formation in the screw holders 24 and 25, the punch 33 is advanced to apply a force to the coil C to thereby form the interengaging head 50. The coil C finally formed as the coiled fastener element E is suitably cooled by an air stream jetted from an air nozzle 44 and discharged outwardly of the apparatus by way of a discharge chute 35. A cutter 43 is provided to sever the wire W in an event that the wire W is coiled about the rod 11 in an incorrect manner.

Figure 1B:
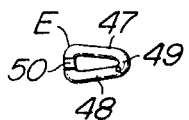

With the apparatus according to the invention having a structure as described in the foregoing, description will be given hereinunder with regard to cooperative movements of the components of the apparatus and a method of making a coiled fastener element E by the apparatus. The apparatus of the invention shown in FIGS. 2–7 is adapted to manufacture a coiled fastener element E, as illustrated in FIGS. 1a and 1b, which has each pair of leg portions 47 and 48 extending substantially horizontally in parallel relation with each other to merge with the interengaging head 50 and in which a curved or turned-over portion 49 connecting the other ends of the leg portions 47 and 48 is solely aslant with respect to the horizontally running leg portions 47 and 48.

The forming operation by the apparatus is carried out by the combination of the intermittent vertical movement of the rod 11 and the rod holder 8, the circular movement of the bobbin 4 about the axis of the rod 11 and the rotation of the screw 13 and 14 in synchronism with the movement of the bobbin 4, and the operation is effected at the root portion of the rod 11 at which the rod 11 is held in the rod holder 8. Or more precisely, as the bobbin 4 makes the circular movement about the rod 11 by the rotation of the rolling disk 1, the wire W on the bobbin 4 is fed past a guide roller 6 to be coiled about the root portions of the rod 11 and the auxiliary rod 12. Meanwhile, the rod holder 8 having the stepped head portion 9 is urged upwardly as shown by arrow A in FIG. 4 by the cam means (not shown) provided adjacent the lower end of the slidable shaft 7, and as the wire W is further coiled about the rod 11 and the auxiliary rod 12, the formation of the turned-over portion 49 of the leg portions 47 and 48 is completed as shown in FIG. 5. Simultaneously with the formation of the turned-over portion 49, the rod holder 8 completes its maximum upward stroke and guides the leg portion 47 into the lowermost root 15 of the thread of the screw 13 while supporting the coiled wire W with its head. Therefore, the wire W can extremely smoothly be taken up by the screw 13 along the slope of the lowermost thread 16. Then, as the slidable shaft 7 moves downwardly, the auxiliary rod 12 moves downwardly away from the lowermost loop of the coil C. As a result thereof, the loops are loosely coiled about the rod 11 alone with a sufficient space therebetween and successively guided upwardly as the screws 13 and 14 are rotated.

According to the invention, the crests 16 and 17 and the roots 15 and 18 of the threads of the respective screws 13 and 14 are arranged to face each other at all times, as described in the foregoing. When, with this arrangement, the wire W successively formed into a series of continuous coil-like loops is moved upwardly between the rotary screws 13 and 14, the leg portion 47 of the coil C coiled about the rod 11 is continuously guided upwardly at a constant speed by the screw 13 of greater length, while the leg portion 48 is temporarily restricted from its upward movement by the thread 17 at the lower end of the screw 14. The leg portion 48 would not be fed upwardly until it is engaged in the root 18 of the thread after a certain rotation of the screw 14. Therefore, the leg portions 47 and 48 and the interengaging head 50, except the turned-over portion 49, of each loop of the coil C are straightened out to take a horizontal disposition and the loops of the coil C are successively guided upwardly while being supported between the opposed screws 13 and 14. It will be appreciated that there are utterly no possibilities of causing any severing and undesirable deformation of the coil C during the rectifying operation because the leg portions 48 to be rectified by the above operation are made longer than the leg portions 47 by an amount corresponding to the diameter of the auxiliary rod 12 which is used during the coiling operation of the wire W.

Forming operation after the above operation may be performed in a manner entirely similar to those widely employed in the prior practices. Or more precisely, when the coil C is gradually softened by the heaters 26 and 27 embedded in the screw holders 24 and 25 and reaches the point of head formation disposed at a position intermediate the length of the screw holders 24 and 25, the punch 33 is advanced towards the coil C, as shown in FIG. 7, to form the interengaging head 50. The coiled fastener element E after having been formed with the interengaging heads 50 is guided upwardly past the upper portions of the screw holders 24 and 25 and is rapidly cooled to harden by a cold blast jetted from the air nozzle 44. The element E then is urged laterally outwardly away from the upper end of the rod 11 and discharged outwardly of the apparatus by the way of the chute 35.

As described in detail in the above, the apparatus according to the invention which comprises a rod, an auxiliary rod of shorter length juxtaposed with the rod, a rod holder of peculiar shape for securely holding the rod and the auxiliary rod, and a pair of rotary screws disposed on opposite sides of the rod and having their lower ends staggered from each other can attain a unique forming operation, in spite of an extremely simple structure, by which a coiled wire can automatically and continuously be formed to obtain a coiled fastener element in a remarkably accurate manner and at a high speed without any injury on the coiled wire. It will be appreciated that the inventive apparatus is most suitable for the manufacture of a coiled fastener element having horizontally parallel leg portions, the manufacture of which heretofore has required an apparatus of extremely complicated structure. Regardless to say, the inventive apparatus is also applicable to the manufacture of a coiled fastener element of conventional structure in which leg portions are not horizontally parallelly disposed. In this latter case, the position of one of the control blocks relative to the other may be adjusted to adjust the vertical position of one of the screws relative to the other. Thus, the present invention provides a universal method and apparatus which can widely be used for the manufacture of a coiled fastener element of any desired shape.

What is claimed is:

1. An apparatus for manufacturing coiled continuous fastener elements from a wire of thermoplastic material comprising rod means for coiling a wire of thermoplastic material thereabout, a pair of rotatable screw means having a substantially same pitch and disposed on opposite sides of said rod means in closely juxtaposed parallel relation therewith, said screw means being operative to feed the wire coiled about said rod means while rectifying the shape of the coiled wire, said rod means being so shaped that the diameter of a portion thereof about which the wire is first coiled is made greater than the diameter of the remaining portion thereof, and a rod means holder for supporting the lower end of said rod means at a position adjacent the portion of said rod means about which the wire is first coiled, said rod means holder being vertically slidable for thereby causing a reciprocating movement of said rod means in the axial direction thereof.

2. An apparatus according to claim 1, in which said rod means consists of a first rod of constant diameter throughout its length and a second rod disposed in side-by-side relation to said first rod so that said rod means has a greater diameter than the remaining portion at a position at which said second rod is juxtaposed with said first rod.

3. An apparatus according to claim 1, in which means are provided to enable the adjustment of relative positions of said pair of screw means in the axial direction thereof.

4. An apparatus according to claim 1, in which the lower end of one of said pair of screw means terminates at a position lower than that of the other screw means.

5. An apparatus according to claim 4, in which shoulders are formed at the upper end of said rod means holder in a manner that the shoulder disposed below said screw means having the lower end terminating at the lower position is made lower than the shoulder on the opposite side so as to avoid any interference on the coiling operation of the wire by the shoulders of said rod means holder and in which the axially reciprocating movement of said rod means holder is effected in synchronism with the coiling of the wire and rotation of said screw means.

6. An apparatus according to claim 5, in which said pair of screw means have screw threads of the same direction and adapted to rotate in the same direction.

7. An apparatus according to claim 6, in which relative positions of adjacent screw threaded portions of said parallelly disposed screw means are such that the position of the screw threaded portion of one of said screw means with the lower end terminating at the lower position is made slightly higher than that of the other screw means whereby one row of aligned leg portions of the coiled continuous fastener element rectified in its shape by said screw means can be made substantially parallel with the other row of aligned leg portions of the coiled element.

8. An apparatus for manufacturing coiled continuous fastener elements comprising a stationary sleeve, a bobbin mounted on said stationary sleeve for rotation thereabout for thereby suppling a wire of thermoplastic material, a rod means holder operatively connected with a shaft slidably fitted in said stationary sleeve for free vertical movement therein, shoulders formed at the top end of said rod means holder, a rod means consisting of a first rod and a second rod of shorter length than the first rod and firmly fixed to said rod means holder centrally thereof, a pair of rotary screw means parallelly disposed on opposite sides of said rod means and having their lower ends terminating in staggered relation from each other, screw means holders for supporting said first rod and said screw means extending upwardly therethrough, and control blocks for rotatably receiving therein upper portions of said screw means for effecting vertical movement of said screw means independently of each other.

References Cited by the Examiner

UNITED STATES PATENTS

| | | | |
|---|---|---|---|
| 2,514,728 | 2/1957 | Wahl | 18—19 X |
| 2,878,514 | 3/1959 | Nichols et al. | 18—19 |
| 2,980,959 | 4/1961 | Genovese | 264—281 |
| 3,035,307 | 5/1962 | Todao Yoshida | 18—19 |
| 3,137,037 | 6/1964 | Wilcken | 18—19 |
| 3,183,698 | 5/1965 | Platt | 72—145 |

FOREIGN PATENTS 379,109   8/1964   Switzerland.

WILLIAM J. STEPHENSON, *Primary Examiner.*